Dec. 20, 1949    D. D. AUSTIN, SR    2,491,637
GEAR SHAPING CUTTER
Filed Dec. 16, 1946    2 Sheets-Sheet 1
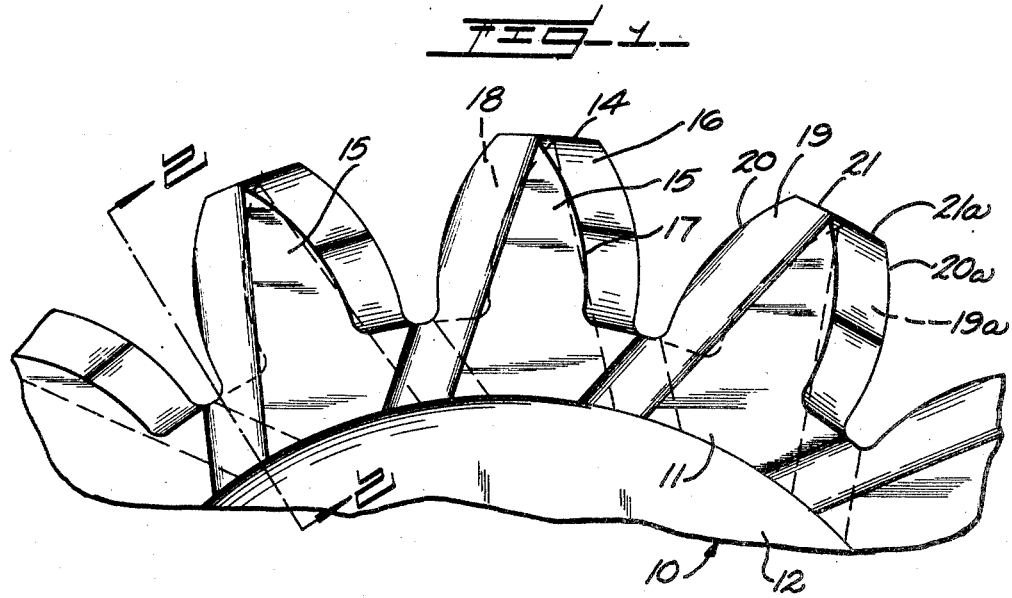
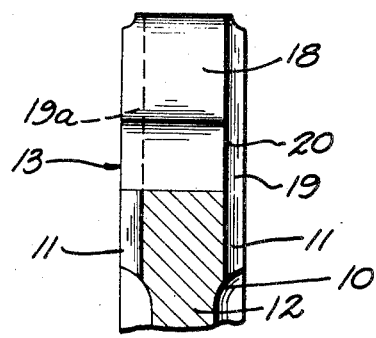   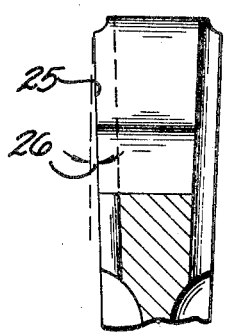
INVENTOR.
DONALD D. AUSTIN SR.
BY
Whittemore, Hulbert
& Belknap
ATTORNEYS.

Dec. 20, 1949 D. D. AUSTIN, SR 2,491,637
GEAR SHAPING CUTTER
Filed Dec. 16, 1946 2 Sheets-Sheet 2
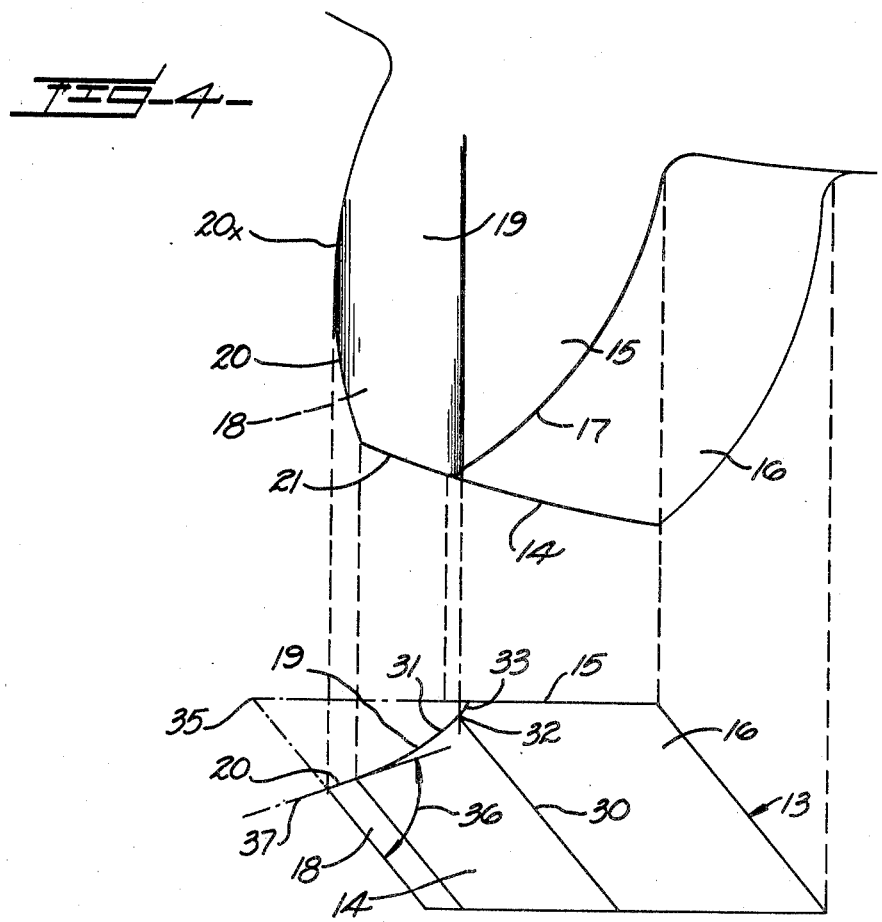
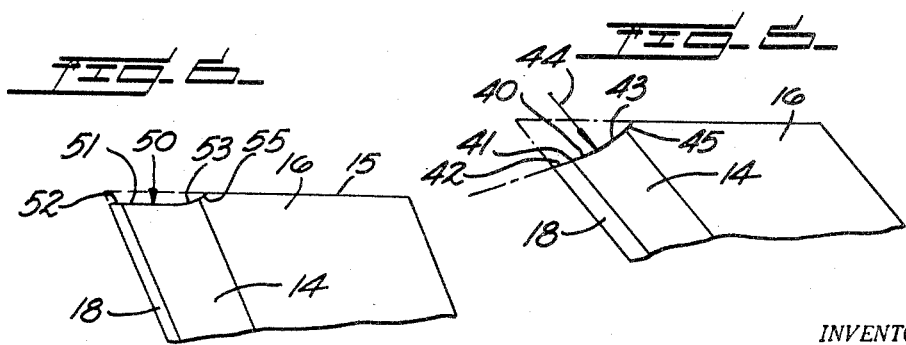
INVENTOR.
DONALD D. AUSTIN, SR.
BY
Whittemore, Hulbert
& Belknap ATTORNEYS.

Patented Dec. 20, 1949

2,491,637

UNITED STATES PATENT OFFICE 2,491,637

GEAR SHAPING CUTTER

Donald D. Austin, Sr., Detroit, Mich., assignor to National Broach & Machine Company, Detroit, Mich., a corporation of Michigan Application December 16, 1946, Serial No. 716,599

6 Claims. (Cl. 29—103)

The present invention relates to a gear shaper cutter and more particularly to a gear shaper cutter provided with a modified surface to effect an improved manner of chip disposal.

The invention relates to the type of gear shaper cutter which has come to be known in the art as a Fellows type shaper cutter. Gear shaper cutters of this type are in the form of a gear conjugate to the teeth of a gear to be formed and provided with cutting edges at the ends of the teeth formed by the intersections of the side surfaces and the top surfaces of the teeth with the end surfaces thereof. Cutters of this type may be designed to operate in a single direction or if preferred they may be adapted to cut in both directions of axial reciprocation.

In the conventional operations, cutters of this type are reciprocated axially while located with their axes parallel to the axis of a gear blank and the cutter and gear blank are given a slow synchronous rotation. In conventional type shaping the cutter is withdrawn from the work on the back stroke and is then fed toward the work before the beginning of a new stroke so that the cutting operation takes place only in a single direction. It has been proposed in the past to effect cutting operation on a single side of the teeth only in one direction and cutting on the opposite side of the teeth only in the other direction.

More recently it has been proposed to employ a cutter of this type which is characterized by its flexibility. This cutter is flexed either before it contacts the work or as it contacts the work so as to produce clearance in back of the cutting edge. The cutter flexes in the opposite direction on the opposite stroke. Accordingly, this cutter at least as applied to spur gears cuts on both sides of the teeth in both directions of reciprocation. As applied to helical gears, however, the flexing of the cutter results in an effective incremental rotation relative to the gear blank, with the result that the teeth of the helical cutter cut only on one side in each direction of reciprocation. This side of the teeth of the cutter which performs the cutting operation is the side at which an acute angle is formed by the side surface of the tooth and an end surface of the tooth perpendicular to its axis. Clearance appears at the opposite side of the cutter tooth between the cutter tooth and the surface of the tooth space being cut.

As the cutter and work gear are rotated together each cutter tooth takes a succession of cuts in a single tooth space. A single continuous chip is formed by the tip edge and the adjacent acute angled side edge of the cutter tooth. This chip as it is formed tends to move upwardly away from the tip of the tooth and at the same time laterally across the end of the cutter tooth. If clearance exists at the opposite side of the cutter tooth this chip is drawn into the space, with the result that it becomes wedged therein, forming gouges in the surface of the tooth and in some cases effecting a displacement between the work blank and portions at least of the cutter so as to introduce irregularities to the finished teeth.

The control of chips formed in this operation poses a critical problem, since unless adequate chip control is provided, the operation as a whole is unsuccessful. It has been found that by imparting a specific modification to the ends of the cutter teeth the problem of chip control is completely solved and this modification may also be employed, in the case of high angle helical gears, to reduce the acuteness of the acute angled corners of the cutter teeth, as will presently be described.

With the foregoing general remarks in mind, it is an object of the present invention to provide a gear shaper cutter having teeth the ends of which are modified to effect chip control.

It is a further object of the present invention to provide a helical gear shaper cutter having cutting teeth the ends of which are provided with chip forming troughs.

It is a further object of the present invention to provide helical gear shaper cutter teeth with chip forming troughs which extend generally along the ends of the teeth at the sides adjacent the acute angle corners, in which said troughs intersect the tops of the teeth and at least a portion of the opposite sides of the teeth adjacent the top.

Other objects and features of the invention will become apparent as the description proceeds, especially when taken in conjunction with the accompanying drawings, wherein:

Figure 1 is a fragmentary front elevation of a portion of a gear shaper cutter;

Figure 2 is a section on the line 2—2 of Figure 1;

Figure 3 is a view similar to Figure 2 illustrating a somewhat modified construction;

Figure 4 is an elevation of a cutter tooth looking directly down the chip forming trough and a projection of this view taken at 90° therefrom;

Figure 5 is a view similar to the lower portion of Figure 4 illustrating a somewhat different embodiment of the invention; and Figure 6 is a view similar to Figure 5 illustrating yet another embodiment of the invention.

While the present invention may be applied to conventional Fellows type cutters either of the type designed for operation in a single direction of reciprocation or the type designed for operation in both directions of reciprocation, it finds its greatest field of utility as applied to gear shaper cutters of the type employed to perform cutting at one side only of the cutter teeth, and accordingly it is illustrated in conjunction with such a cutter.

Referring now to Figures 1 and 2, there is illustrated a cutter 10 which is provided with a central supporting hub (not shown) of the type illustrated and described in United States application Serial No. 683,650, on "Gear shaper," filed July 15, 1946. Adjacent the periphery of the cutter is a rim 11 and intermediate the rim 11 and the hub is a relatively thin flexible web 12. The web 12 is of a thickness which permits flexing of the cutter as it contacts the gear blank so that clearance in back of the cutting edges of the teeth is automatically introduced, all as fully set forth in the above identified application. The rim 11 is relatively heavy and forms a substantially rigid supporting structure for the teeth 13. As best seen in Figure 1, the teeth 13 are helical and have tops 14, end surfaces 15, side surfaces 16 which normally intersect the end surfaces 15 to form an obtuse corner 17, and side surfaces 18 which normally intersect the end surfaces 15 to form acute angled corners. These acute angled corners in accordance with the present invention are relieved or modified by chip forming troughs 19 which intersect the side surfaces 18 to form cutting edges 20. In addition, the top surfaces 14 of the teeth are intersected by the troughs 19 to form top cutting edges 21. Preferably the opposite ends of the teeth are provided with similar chip forming troughs 19a which intersect the side surfaces 16 to form cutting edges 20a and intersect the tops 14 to provide top cutting edges or tips 21a.

Referring now to Figure 3, a cutter tooth of substantially similar characteristics is illustrated but is modified in that the ends of the cutting teeth before formation of chip troughs 19 are formed with a slight conical or dished surface 25 which provides a rake angle such as 26 as seen in this figure. The present invention is applicable to teeth, whether provided with rake angle 26 or not.

Referring now to Figure 4, which shows two views of a modified cutter tooth projected one from the other, it will be observed that the trough 19 extends generally along the corner of the tooth which is normally formed by the acute angle intersection between the side 18 and the end surface 15. As a matter of convenience, it is found that the trough 19 may be a straight trough of uniform cross section such for example as may be produced by a grinding wheel traversed in a straight line. In theory it might be preferable to generate the trough 19 to follow the involute side of the tooth, but in practice this rather more difficult and expensive operation is found to be entirely unnecessary.

There are two essential and fundamental characteristics of the trough 19 upon which depend its efficacy as a means for preventing wedging and jamming of chips during the cutting operation. The first of these is the curvature of the trough at the portion of the trough which intersects the top corner of the tooth which is formed by the intersection between the side 16 and the top 14. The curvature of the trough 19 at this point, which is designated 32 in the drawing, is indicated at 31 and will of course vary in accordance with the pitch of the teeth, but in general it may be stated that the amount of curvature must be relatively high. In other words, if this curvature is provided as a circular curvature, its radius of curvature must be relatively small. As a practical matter, a radius of curvature on the order of 1/16" was found entirely suitable for a cutter having teeth of 10 pitch, 20° pressure angle.

The second important feature of this chip forming trough is its location with respect to the top of the teeth. It is essential that the curved portion 31 of the trough extend completely to and intersect with the top corner of the tooth so that the end surface of the tooth just below its top surface 14 and adjacent the corner 32, shall be an abruptly curved surface. In theory it would be possible to provide a trough 19 so that it ran out of the end of the tooth at the point defined by the intersection of the top 14, the side 16 and the end 15. This, however, would result in the formation of a needle-point which would be unsupported and which would crumble after short usage. Accordingly, the trough 19 is provided so that it extends completely across the top 14 of the tooth and intersects the side 16 for at least a short distance as indicated at 33.

As previously stated, this cutter is adapted to perform its cutting operation along one side only of the teeth in a single direction of reciprocation, and accordingly no cutting will take place along the edge 17 defined by the intersection of the side 16 and the end 15 except for a very limited distance from the tip 21 thereof, this distance being determined for the most part by the thickness of chip removed by the tip 21.

It will be appreciated that as the tooth 13 takes its cut through a tooth slot, the edge 20 which is formed by the intersection of the side 18 and the trough 19 as well as the tip edge 21 which is formed by the intersection of the top 14 and the trough 19 will be taking a continuous cut. As the chip thus cut starts to form, it tends to move inwardly along the end surface of the cutter tooth away from the tip 21 and at the same time tends to move transversely across the end surface of the cutter tooth away from the cutting edge 20. Since as it is formed the chip remains fast to the metal from which it is being cut along both the bottom of the tooth slot and an adjacent side thereof, the chip is not free to curl as chips normally do and consequently it has been found that with an unmodified cutter, this chip moves directly across the end of the cutter tooth where its edge engages the side of the tooth slot being cut. As motion of the tooth continues through the tooth slot, this edge of the chip is caught by the surface of the tooth slot and the chip is thus drawn and forced into the clearance existing at the opposite side of the cutter tooth. Experiments have shown that chips formed by an unmodified cutter are drawn almost without exception across the end of the cutter teeth and are wedged into the space at the opposite side thereof. This results in a very undesirable cutting condition, as will be readily apparent to those skilled in the art.

If, however, the end surface of the cutter teeth is provided with a transverse curvature such as the curvature 31, and this curvature continues at least to and slightly beyond the top corner 32 of the cutter teeth defined by the intersections of the top 14, the side 16 and the trough 19, an immediate curl is imparted to the chip at the instant it starts, and if this radius of curvature is sufficiently small the chip will curve so that its free edge never contacts the side wall of the tooth slot. As previously stated, by continuing the trough completely across the tip end of the tooth so that it intersects the opposite side as indicated at 33, the formation of a needle-point in the cutting zone is avoided, and since the edge 17 is not a cutting edge except for an inconsiderable distance inward from the tip thereof, the formation of a so-called needle-point further inward along the edge 17 is not objectionable.

In Figure 4 there is illustrated a cutter tooth 13 of a relatively high helix angle, the helix angle in these figures being about 40°. If the cutter tooth were not modified as illustrated, a cutting edge would be presented at 35, which is an acute edge having an included angle of 50°. As is well understood, a cutting edge of such acuteness is not sufficiently supported and tends to crumble under usage. Accordingly, in imparting the chip curling trough 19 to cutter teeth it is preferred to form this trough so that it intersects the side face 18 of the teeth at an angle which forms a desirable cutting edge. As seen in Figure 4 and particularly in the lower view, the acuteness of the cutting edge has been reduced so that the angle between the side 18 and the trough 19 which forms the cutting edge 20 is on the order of 70°, as illustrated by the angle 36. In this figure it will be observed that the trough 19 is of arcuate cross section and this cross section is uniform throughout.

The trough 19 may conveniently be formed by a simple grinding operation employing a narrow grinding wheel having its periphery trimmed to circular cross section having the desired radius of curvature. This wheel is then brought into contact with the acute angled corner of the cutter tooth in such a relationship that at full depth it will be tangent to the line 37 (which is selected to determine the acuteness of the cutting edge 20) and is then traversed in a straight line generally along the acute corner of the cutting tooth until it has reached a depth where it has formed the intersection 33 with the opposite side 16 of the cutter tooth.

In Figure 5 there is illustrated a somewhat similar embodiment of the invention in which, however, the trough 40 has a straight portion 41 which intersects the side 18 of the tooth to form a cutting edge 42 which is of a predetermined acuteness. The other side of the trough 40, as indicated at 43, has a transverse radius of curvature 44 which is selected in accordance with the cutter and gear characteristics in order to provide chip control as previously described. It is important to note that the curved portion 43 of the trough 40 intersects the top 14 of the tooth as well as a portion 45 of the side 16.

In the event that the helix angle of the cutter is not so large, it may not be necessary or desirable to vary the acuteness of the acute angled cutting edge. Such a condition is illustrated in Figure 6, in which the chip forming trough 50 has a flat portion 51 intersecting the side 18 of the tooth in a plane which is parallel to the plane of the end surface 15 thereof so that the cutting edge 52 which is formed by the intersection of the trough 50 and the side 18 has the same acute angle as was present on the unmodified cutter tooth. However, the opposite side of the chip forming trough 50, as indicated at 53, has the predetermined transverse curvature such to provide the chip formation and control previously described. In this case it will be observed that the curved portion 53 of the trough 50 intersects the top 14 of the tooth as well as the side 16 thereof, as indicated at 55.

Referring again to Figure 4, it is important in setting up the grinding wheel to form the trough 19 to take into account the angle at the cutting edge 20 at the point representing the greatest width of trough. In this figure this point is indicated by the numeral 20x, and it is at this point that the grinding wheel should be tangent to the plane which defines the predetermined and desired angle between the trough 19 and the side surface 18, thus setting or predetermining the acuteness of the cutting edge.

Preferably the modification is applied to both ends of the cutter teeth, as is well indicated in Figure 1, inasmuch as this results in a cutter which may be reversed without affecting its function. As a matter of fact, however, the trapping of chips as previously discussed results in most but not all cases from reciprocation in a single direction, this direction being determined by the helix angle of the cutter and the direction of slow relative rotation between the cutter and gear. In some cases, depending in part upon pressure angle of the gear and cutter and in part upon the rate of rotary feed, it may be necessary to have the modification on both ends of the cutter teeth. Inasmuch as the modification has no deleterious effect even on the end where it is not required, it is preferable to provide an identical modification at both sides of the cutter so that as previously mentioned, the cutter may be reversed.

While there has been illustrated and described in detail a shaper cutter modified to effect chip control, it will be understood that the detailed disclosure is intended merely to enable those skilled in the art to practice the invention, the scope of which is indicated by the appended claims.

What I claim as my invention is:

1. A gear shaper cutter having helical teeth provided with cutting edges formed by the intersections of the normal side and top surfaces with end surfaces, said end surfaces including chip curling surfaces extending generally along the acute angled corners thereof and intersecting the tops and the obtuse angled corners thereof adjacent the tops, and having a concave curvature at least adjacent their intersection with said obtuse angled corners which, measured in planes parallel to the top of the teeth, is sufficient to prevent chip trapping.

2. A gear shaper cutter provided with helical teeth having normally acute and obtuse angled corners at the ends thereof, the ends of said teeth having modified surfaces extending generally along the acute angled corners which reduce the acuteness thereof, said modified surfaces extending completely across the ends of said teeth at the tops thereof to intersect said obtuse angled corners below the tops thereof, and having a transverse concave curvature at their intersections with said obtuse angled corners.

3. A helical gear shaper cutter having transversely, concavely curved chip forming troughs extending generally along the normally acute angled ends of its teeth, said troughs intersecting the normally obtuse angled corners for at least a short distance from their tops.

4. A helical gear shaper cutter having transversely, concavely curved chip forming troughs extending generally along the normally acute angled ends of its teeth, said troughs being of uniform cross section and intersecting the normally obtuse angled corners for at least a short distance from their tops.

5. A helical gear shaper cutter having transversely, concavely curved chip forming troughs extending generally along the normally acute angled ends of its teeth, said troughs being of uniform cross section and intersecting the normally obtuse angled corners for at least a short distance from their tops and intersecting the sides forming the normally acute angled corners to reduce the acuteness thereof.

6. A helical gear shaper cutter having straight, transversely, concavely curved chip forming troughs extending generally along the normally acute angled ends of its teeth, said troughs being of uniform cross section and intersecting the normally obtuse angled corners for at least a short distance from their tops.

DONALD D. AUSTIN, Sr.

REFERENCES CITED

The following references are of record in the file of this patent:

UNITED STATES PATENTS

| Number | Name | Date |
|---|---|---|
| 1,668,345 | Sykes | May 1, 1928 |
| 2,108,239 | Sykes | Feb. 15, 1938 |
| 2,258,849 | Erhardt | Oct. 14, 1941 |
| 2,386,572 | Pigott | Oct. 9, 1945 |